United States Patent [19]

Loch

[11] 4,388,435

[45] Jun. 14, 1983

[54] AQUEOUS PIGMENT PASTES AND THEIR USE

[75] Inventor: Werner Loch, Erpolzheim, Fed. Rep. of Germany

[73] Assignee: BASF Aktiengesellschaft, Fed. Rep. of Germany

[21] Appl. No.: 320,020

[22] Filed: Nov. 10, 1981

[30] Foreign Application Priority Data

Jun. 2, 1981 [DE] Fed. Rep. of Germany ....... 3121765

[51] Int. Cl.³ .............................................. C08L 39/06
[52] U.S. Cl. ............................... 524/548; 106/308 M; 204/181 C; 524/516; 524/901
[58] Field of Search ............... 524/548, 808, 809, 425, 524/407, 451, 901, 389, 376, 516; 204/181 C; 106/308 M

[56] References Cited

U.S. PATENT DOCUMENTS 3,356,627 12/1967 Scott ................................... 524/516

FOREIGN PATENT DOCUMENTS 1275029 4/1963 Fed. Rep. of Germany .

OTHER PUBLICATIONS

Ser. No. 320,019, filed Nov. 10, 1981, Loch.

*Primary Examiner*—Paul R. Michl
*Attorney, Agent, or Firm*—Keil & Witherspoon

[57] ABSTRACT

Pigment pastes, comprising water, an organic solvent, a copolymer of one or more water-immiscible, or only partially water-miscible, copolymerizable α,β-olefinically unsaturated compounds and one or more water-soluble copolymerizable N-vinyl compounds, and a finely divided pigment and/or filler dispersed in the mixture of water, solvent and copolymer, are used for pigmenting aqueous solutions or dispersions of surface-coating binders, as toner pastes for water-based finishes, and for pigmenting and toning anodic or cathodic electrocoating finishes.

7 Claims, No Drawings

AQUEOUS PIGMENT PASTES AND THEIR USE

The present invention relates to aqueous pigment pastes and to their use of pigmenting aqueous solutions or dispersions of surface-coating binders, for preparing pigmented high-gloss water-based finishes for various end uses, and for pigmenting anodic or cathodic electrocoating finishes.

German Patent Application P 30 43 601.2 claims pigment pastes and their use for pigmenting organic solutions of surface-coating binders and for preparing pigmented gloss finishes for various end uses. These pastes can also be mixed with aqueous surface-coating binders. However, the resulting finishes can hardly be described as water-based finishes since, due to what is in some cases a very high solvent content in the paste, they still contain substantial amounts of organic solvent.

Accordingly, pigment pastes with a substantially reduced solvent content are desirable for use specifically in water-based finishes.

It is an object of the present invention to provide pigment pastes which conform to these requirements and cause less environmental pollution.

We have found that this object is achieved by a pigment paste which essentially comprises (A) from 1 to 80% by weight of water,
(B) from 5 to 84% by weight of one or more organic solvents,
(C) from 0.1 to 20% by weight of a copolymer of
  (a) from 10 to 75% by weight of one or more water-immiscible, or only partially water-miscible, copolymerizable $\alpha,\beta$-olefinically unsaturated compounds and
  (b) from 25 to 90% by weight of one or more water-soluble copolymerizable N-vinyl compounds, and
(D) from 10 to 79% by weight of one or more finely divided pigments or fillers, or mixtures of pigments and fillers, dispersed in the mixture of (A), (B) and (C), the sum of the percentages of (A), (B), (C) and (D) being 100.

Preferably, the water-immiscible or only partially water-miscible copolymerizable $\alpha,\beta$-olefinically unsaturated compound (a) is a vinyl ester of a $C_2$–$C_{18}$-monocarboxylic acid and/or an acrylic acid ester or methacrylic acid ester of a $C_4$–$C_{18}$-monoalcohol, and the water-soluble copolymerizable N-vinyl compound (b) is N-vinylpyrrolidone.

The present invention further relates to the use of the novel pigment pastes for pigmenting aqueous solutions or dispersions of surface-coating binders or binder mixtures, as toner pastes for pigmented water-based gloss finishes, and for pigmenting or toning anodic or cathodic electrocoating finishes.

It is surprising that the milling, involved in the preparation of the novel pigment pastes, of the pigments with the paste binder solution proves feasible, without flocculation, even in the presence of substantial amounts of water. It was also unforeseeable that the novel pigment pastes would be stable for long periods, without reduction in gloss, in spite of their low binder content and, in some cases, high water content.

The following details may be noted concerning the individual components of the novel pigment pastes:

(A) Component (A) is water, which is present in the novel pigment pastes in an amount of from 1 to 80, preferably from 15 to 60, % by weight.

(B) Component (B) is an organic solvent or solvent mixture which is present in the novel pigment pastes in a concentration of from 5 to 84, preferably from 15 to 50, % by weight. Preferred organic solvents for this purpose are $C_2$–$C_4$-monoalkyl ethers of a monoalkylene glycol or oligoalkylene glycol, eg. of ethylglycol, butylglycol, butyldiglycol, 1-methoxypropan-2-ol and/or their acetates, for example ethylglycol acetate, as well as other organic solvents or solvent mixtures conventionally employed in surface coatings, with the exception of purely aliphatic hydrocarbons.

(C) Component (C) is a copolymer which can be prepared by, for example, solution polymerization, is used in the novel pigment pastes in an amount of from 0.1 to 20% by weight, preferably from 3 to 8% by weight, and contains, as copolymerized units,
  (a) from 10 to 75% by weight, preferably from 20 to 40% by weight, of one or more water-immiscible or only partially water-miscible copolymerizable $\alpha,\beta$-ethylenically unsaturated compounds and
  (b) from 25 to 90% by weight, preferably from 60 to 80% by weight, of one or more water-soluble copolymerizable N-vinyl compounds.

The sum of the percentages of (a) and (b) is 100.

Preferred water-immiscible or only partially water-miscible $\alpha,\beta$-ethylenically unsaturated compounds (a) are vinyl esters of a $C_2$–$C_{18}$-monocarboxylic acid, eg. vinyl acetate, vinyl propionate, vinyl pivalate, vinyl 2-ethylhexanoate and vinyl stearate, and/or acrylic acid esters or methacrylic acid esters of $C_4$–$C_{18}$-alcohols, eg. butyl acrylate, butyl methacrylate, 2-ethylhexyl acrylate, lauryl acrylate and octadecyl acrylate. A particularly preferred monomer is vinyl propionate. Other, less preferred, examples of component (a) are water-insoluble or only slightly water-soluble derivatives of acrylamide or methacrylamide, vinyl ethers and/or vinyl-aromatics, such as styrene.

Examples of preferred water-soluble N-vinyl compounds (b) are N-vinylpyrrolidone, N-vinylpiperidone and N-vinylimidazole.

Component (C) can be prepared by conventional solution polymerization, preferably in such solvents as have been mentioned under (B), which may or may not be mixed with water.

The Fikentscher K value of component (C) is in general from 20 to 50, preferably from 25 to 40.

(D) Component (D) is an inorganic or organic pigment conventionally used in surface coatings, a filler or a mixture of pigment and filler, finely dispersed in the mixture of components (A), (B) and (C) and present in the novel pigment pastes in an amount of from 10 to 79% by weight, preferably from 15 to 70% by weight.

Preferred inorganic pigments and fillers are titanium dioxide, chromium oxide, chromates, iron oxides, iron complexes, molybdate pigments, zinc sulfide, barium sulfate, chalk and talc; preferred organic pigments are carbon black, phthalocyanine derivatives, perylene derivatives, quinacridone derivatives, flavanthrone derivatives, anthrapyrimidine derivatives and pyranthrone derivatives. Of course, mixtures of the said pigments and fillers can also be used, in order to obtain specific hues.

The sum of the percentages of (A), (B), (C) and (D) is 100.

The novel pigment pastes can furthermore contain minor amounts of other assistants conventionally used in surface coatings, such as flow control agents, wetting agents, anti-foam agents, neutralizing agents, dispersants, thixotropic agents and anti-settling agents.

A pigment paste according to the invention may be prepared, for example, by working component (D) into a paste, preferably with a 1–10% strength by weight solution of copolymer (C) in a mixture of components (A) and (B), wet-milling the paste by one of the methods conventionally used in surface-coating technology, and in this way finely dispersing (D) in the mixture of (A), (B) and (C); advantageously, a dissolver or similar mixing unit is employed for preparing the paste. Preferred dispersers are shaking machines, for example the Red Devil from Erichsen, agitated ball mills, sand mills and the like; for rheological reasons, a closed milling apparatus is preferred. Other conventional surface-coating assistants which may also be used can be incorporated into the mixture even before dispersing the pigment.

The pigments and/or fillers (D) present in the novel pigment pastes after dispersing in general have a particle size of less than 15 μm, according to DIN 53,203. The pastes can have solids contents of, for example, from 15 to 80% by weight, preferably from 20 to 70% by weight; they remain pourable after storage for a week or more, and show virtually no tendency to settle out. They can be pumped, and can accordingly also be readily handled in closed pipeline circuits.

The novel pigment pastes exhibit universal compatibility and can therefore be mixed with aqueous solutions or dispersions of very diverse types of surface-coating binders, for example acrylate resins, saturated and unsaturated polyester resins, alkyd resins, epoxy resins, polyurethane resins and aminoplast resins, as well as with all conceivable intramolecular and intermolecular combinations of these.

The paste is mixed with the amount of binder or binder mixture which corresponds to the desired volumetric concentration of pigment. As a rule, the binder is added to the paste, but the converse sequence can also be used. Mixing is preferably effected with a high-speed stirrer, though speeds of 2,000 rpm are more than adequate. Any conventional surface-coating assistants which are to be used are preferably added during mixing. The resulting finishes can be diluted to the desired use viscosity with water, and exhibit the usual level of stability.

To obtain specific hues, the novel pigment pastes can also be mixed with one another in the requisite ratio, and then mixed with the binder. Pastes prepared using different copolymers (C) are fully compatible with one another. Finally, it is also possible to tone water-based finish by subsequent incorporation of small amounts of a pigment paste according to the invention.

The finishes obtained can be applied to a great variety of substrates, for example paper, wood, glass, ceramics, leather, plastics and metals. The preferred substrate is metal. The novel pigment pastes may be used, for example, to formulate water-based primers, fillers and top lacquers for automobile bodywork. Water-based lacquers suitable for coil coating can also be obtained by mixing the pastes with appropriate binders.

The finishes can be applied by conventional methods, such as brushing, knife-coating, spraying, roller-coating, pouring or printing, as well as by anodic or cathodic electrocoating. Depending on the particular formulation, the coatings can be hardened by physical and/or oxidative drying, in the majority of cases at an elevated temperature, such as is conventionally employed for the purpose. The coatings obtained exhibit good resistance to climatic conditions and good technological properties, equivalent to those obtained with finishes produced by direct milling, ie. the properties are unaffected by the presence of the paste binder (C).

The Examples which follow illustrate the present invention without implying any limitation thereof. Parts and percentages are by weight, unless stated otherwise.

EXAMPLE 1

(a) Preparation of the Paste Binder

200 Parts of ethylene glycol monobutyl ether are heated to 90° C. in a reaction vessel. A mixture of 396 parts of N-vinylpyrrolidone, 204 parts of vinyl propionate and 1.2 parts of azo-bis-isobutyronitrile is then added dropwise in the course of 2 hours. Finally, polymerization is completed by allowing 1 hour at 90° C. The solution polymer obtained has a Fikentscher K value of 24.

The solids content of the copolymer solution is 76%.

(b) Preparation of a White Paste

500 Parts of titanium dioxide are worked into a paste with a mixture of 53 parts of the copolymer of Example 1(a), 168 parts of ethylene glycol monobutyl ether and 180 parts of water, and the paste is dispersed with 1,000 parts of steel balls for 2 hours in a shaking machine (for example a Red Devil). The white paste obtained after separating off the steel balls has the following characteristics:
seediness according to DIN 53,203: <7 μm
solids content: 60%
pigment content: 55.5%
binder content: 4.5%
solvent content: 20%
water content: 20%

(c) Preparation of a Blue Paste 3.6 Parts of copper phthalocyanine are worked into a paste with a mixture of 0.7 part of the polymer of Example 1(a), 4.6 parts of ethylene glycol monobutyl ether and 4.8 parts of water, using a high-speed stirrer. The mixture is then passed twice through a continuous-flow agitated ball mill, at a throughput of about 8 l/h. Steel balls are used as the grinding medium. The blue paste obtained has the following characteristics:
seediness according to DIN 53,203: <15 μm
solids content: 20.2%
pigment content: 26.3%
binder content: 3.9%
solvent content: 35%
water content: 35%

(d) Preparation of a Yellow Paste

146 Parts of iron oxide yellow are worked into a paste with a mixture of 45 parts of the polymer of Example 1(a), 199 parts of ethylene glycol monobutyl ether and 210 parts of water, and the paste is dispersed in a batch-operated agitated ball mill for about 1 hour, using 500 parts of glass beads. The yellow paste obtained after separating off the glass beads has the following characteristics:
seediness according to DIN 53,203: <10 μm
solids content: 30%
pigment content: 24.3% binder content: 5.7%
solvent content: 35%
water content: 35%

(e) Preparation of an Orange Paste 65.8 Parts of a commercial orange pigment are worked into a paste with a mixture of 12.1 parts of the polymer of Example 1(a), 55.4 parts of ethylene glycol monobutyl ether and 116.7 parts of water, and the paste is dispersed in a batch-operated agitated ball mill for about 1 hour, using 200 g of glass beads. The orange paste obtained after separating off the glass beads has the following characteristics:

seediness according to DIN 53,203: <10 μm
solids content: 30%
pigment content: 26.3%
binder content: 3.7%
solvent content: 23.3%
water content: 46.7%

EXAMPLE 2

Toning pastes

(a) Preparation of a Modified Blue Paste

100 Parts of the blue paste of Example 1(c) and 31.5 parts of the white paste of Example 1(b) are mixed by stirring. The resulting blue paste shows no coarsening (flocculation) and has the following characteristics:

solids content: 37.3%
pigment content: 33.3%
binder content: 4.0%
solvent content: 31.4%
water content: 31.4%

(b) Preparation of a Modified Orange Paste 45.6 Parts of the orange paste of Example 1(e), 5.4 parts of the white paste of Example 1(b) and 20.6 parts of the yellow paste of Example 1(d) are mixed by stirring. The resulting orange paste shows no coarsening (flocculation) and has the following characteristics:

solids content: 32.3%
pigment content: 28.0%
binder content: 4.3%
solvent content: 26.4%
water content: 41.3%

EXAMPLE 3

Preparation of Finishes

The finishes described below can be prepared successfully with any of the pigment pastes of Examples 1 and 2, given due attention to the desired volumetric pigment concentration, and are therefore to be regarded as merely illustrative.

(a) Preparation of a White Finish

200 Parts of the white paste of Example 1 are mixed for one minute with 414.5 parts of a mixture of 95 parts of a commercial polyacrylate resin, having an acid number of about 40 and a Fikentscher K value of about 25, 6 parts of dimethylethanolamine, 28.5 parts of a commercial methanol-etherified melamine-formaldehyde resin and 285 parts of water, using a high-speed stirrer running at 2,000 rpm.

The finish obtained has the following characteristics:
solids content: 39.6%
solvent content: 6.5%
amine content: 1.0%

The finish is knife-coated onto metal sheets and baked for 30 minutes at 150° C. Very glossy coatings are obtained, having properties corresponding fully to those obtained with the directly pigmented clear finish mixture.

(b) Preparation of a Blue Finish

200 Parts of the blue paste of Example 2(a) are mixed for one minute with 946 parts of a mixture of 256 parts of a commercial saturated polyester, having an acid number of about 40 and an OH number of about 90, 16 parts of dimethylethanolamine, 77 parts of a commercial methanol-etherified melamine-formaldehyde resin and 597 parts of water, using a high-speed stirrer running at 2,000 rpm. The resulting finish has the following characteristics:

solids content: 35.6%
solvent content: 5.5%
amine content: 1.4%

The finish is applied (if necessary after dilution with water) to metal sheets and is baked for 30 minutes at 150° C. The coatings obtained are very glossy and exhibit the same properties as coatings obtained with a corresponding directly pigmented clear finish mixture.

(c) Preparation of an Orange Finish

200 Parts of the orange paste of Example 2(b) are mixed for 1 minute with 703 parts of a mixture of 215 parts of a commercial short-oil alkyd resin, having an acid number of about 45 and an OH number of about 60, 15 parts of dimethylethanolamine, 65 parts of a commercial methanol-etherified melamine-formaldehyde resin and 408 parts of water, using a high-speed stirrer running at 2,000 rpm. The resulting finish has the following characteristics:

solids content: 38.2%
solvent content: 5.8%
amine content: 1.7%

The finish is applied (if necessary after dilution with water) to metal sheets and is baked for 30 minutes at 150° C. The coatings obtained are very glossy and exhibit the same properties as coatings obtained with a corresponding directly pigmented clear finish mixture.

We claim:

1. A pigment paste comprising
   (A) from 15 to 60% by weight of water;
   (B) from 15 to 50% by weight of one or more organic solvents;
   (C) from 0.1 to 20% by weight of a copolymer of
      (a) from 10 to 75% by weight of one or more water-immiscible, or only partially water-miscible, copolymerizable $\alpha,\beta$-olefinically unsaturated compounds and
      (b) from 25 to 90% by weight of one or more water-soluble copolymerizable N-vinyl compounds; and
   (D) from 10 to 79% by weight of one or more finely divided pigments or fillers, or mixtures of pigments and fillers, dispersed in the mixture of (A), (B), (C), the sum of the percentages of (A), (B), (C) and (D) being 100.

2. The pigment paste as claimed in claim 1, wherein the organic solvent (B) is a $C_2$–$C_4$-monoalkyl ether of ethylene glycol, and/or the monoacetate thereof.

3. The pigment paste as claimed in claim 1, wherein component (a) present as copolymerized units in the copolymer (C) is a vinyl ester of a $C_2$–$C_{18}$-monocarboxylic acid and/or an acrylic acid ester or methacrylic acid ester of a $C_4$–$C_{18}$-monoalcohol.

4. The pigment paste as claimed in claim 1, wherein component (b) present as copolymerized units in the copolymer (C) is N-vinylpyrrolidone.

5. A process for pigmenting an aqueous solution or dispersion of a surface-coating binder or binder mixture, wherein a pigment paste as defined in claim 1 is mixed with said binder or binder mixture.

6. A process for toning a pigmented water-based gloss finish, wherein a pigment paste as defined in claim 1 is added to said pigmented water-based gloss finish.

7. A process for the preparation of a pigmented anodic or cathodic electrocoating finish, wherein a paste as defined in claim 1 is added to the aqueous solution or dispersion of an electrocoating binder or binder mixture.

* * * * *